Figure 5:
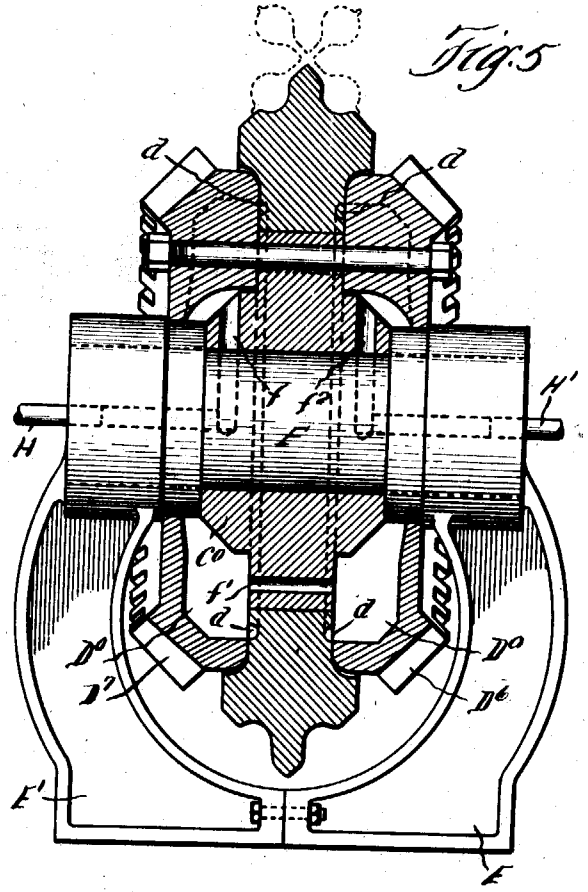

Oct. 7, 1924. Re. 15,923
W. B. COWLES
DIE ROLLING MILL FOR THE MANUFACTURE OF ROLL FORGINGS
Original Filed July 15, 1918 2 Sheets-Sheet 1
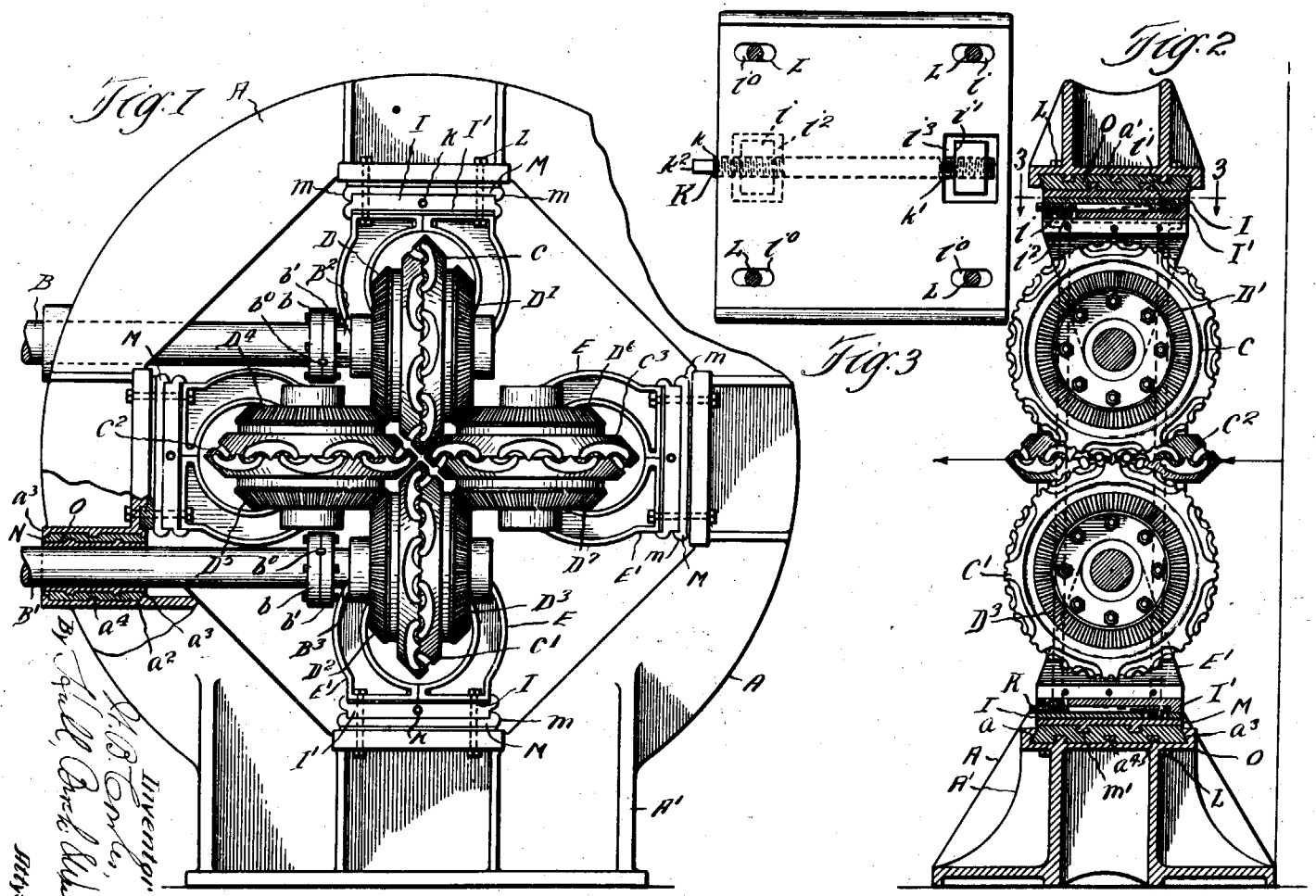

Oct. 7, 1924.

W. B. COWLES

Re. 15,923

DIE ROLLING MILL FOR THE MANUFACTURE OF ROLL FORGINGS

Original Filed July 15, 1918 2 Sheets-Sheet 2

Inventor
W. B. Cowles,
By Hull, Brooks & Wise
Attys

Reissued Oct. 7, 1924. Re. 15,923

UNITED STATES PATENT OFFICE.

WILLIAM BARNUM COWLES, OF CLEVELAND HEIGHTS, OHIO, ASSIGNOR TO WELDLESS CHAIN CORPORATION, OF DOVER, DELAWARE, A CORPORATION OF DELAWARE.

DIE ROLLING MILL FOR THE MANUFACTURE OF ROLL FORGINGS.

Original No. 1,431,443, dated October 10, 1922, Serial No. 245,057, filed July 15, 1918. Application for reissue filed June 7, 1923. Serial No. 644,049.

*To all whom it may concern:*

Be it known that I, WILLIAM BARNUM COWLES, a citizen of the United States, formerly residing at Philadelphia, Pennsylvania, and now a resident of Cleveland Heights, in the county of Cuyahoga and State of Ohio, have invented a new and useful Improvement in Die Rolling Mills for the Manufacture of Roll Forgings, of which the following is a full, clear, and exact description, reference being had to the accompanying drawings.

My present invention relates to improvements in die rolling mills for roll forgings in general, but more especially for rolling weldless chain from a single homogeneous bar of cruciform cross section.

Incident to the operation of the herein described apparatus this bar is presumed to be rolled into cruciform cross section from a single billet into the desired length. In making heavy chain cables such a bar should be long enough to make a chain cable shot of 15 fathoms, or since the bar is elongated somewhat in the process of rolling, the bar should preferably be about 65 feet more or less in length; but obviously the length of the bar would determine the length of the corresponding chain produced therefrom.

According to my present invention this cruciform bar is fed while hot between the faces of a plurality of die rolls placed at right angles to each other, and the requisite contour is imparted to the bar as it is passed through the die rolls themselves.

This leaves the bar with the chain links outlined therein, the adjacent links being at right angles to each other, but the bar after passing through the die rolls is left with protruding fins and extruded metal, exterior to the links, and with a web on the interior of the links, which fins, web and extruded metal are removed later on, as fully described in my application entitled Automatic trimming press for manufacturing weldless chain, Serial No. 245,926, filed July 20, 1918, the final product being shown in my other application entitled Weldless studlink ship-cable shot, Serial No. 245,056, filed July 15, 1918.

The present invention relates only to the operation of producing a roll forging in the form of a strip bearing a series of units, and the invention relates particularly to improved apparatus for accomplishing this result.

Figure 4:
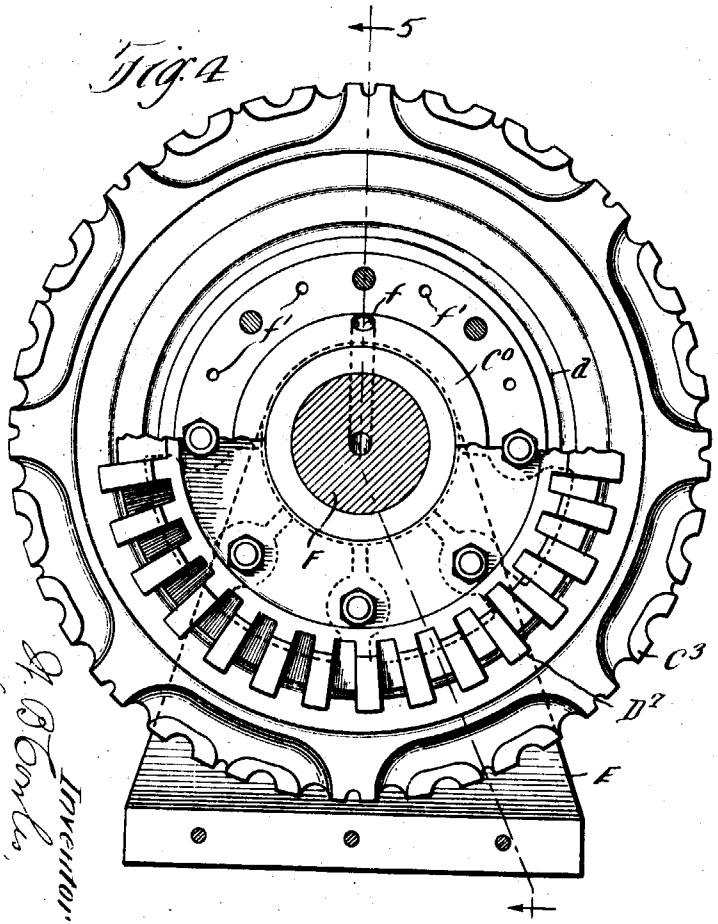

This apparatus will be more fully understood after reference to the accompanying drawings, in which similar parts are indicated by similar reference symbols throughout the several views, and in which Fig. 1 is a front elevation, partly in section, showing the complete set of die rolls journaled in their yokes and housing, together with the power shafts for driving the same; Fig. 2 shows a central vertical section through Fig. 1, parts being shown in elevation; Fig. 3 is a detail showing a plan of one of the adjustable wedges, the fastening bolts being shown in section along the line 3—3 of Fig. 2 and looking in the direction of the arrows; Fig. 4 is an enlarged side view of one of the die rolls, the upper half of the figure being shown with the bevel gear removed and the bolts for same being shown in section; and Fig. 5 shows a section along the broken line 5—5 of Fig. 4, and looking in the direction of the arrows.

A represents the housing which is preferably in the form of a substantially circular casting mounted on the pedestal A′.

B and B′ represent the two power shafts which are driven at the same speed, and in reverse directions, by any suitable gearing from any suitable source of power, not shown.

The power shaft B is provided with a coupling flange $b$ which is rigidly attached to the coupling flange $b'$ on the short shaft $B^2$, on which the hub of the die roll C and the bevel gears D and D′ are rigidly mounted.

In a similar way the power shaft B′ has its flange $b$ attached to the flanged end $b'$ of the short shaft $B^3$ on which the hub of the die roll C′ and of the bevel gears $D^2$ and $D^3$ are mounted.

The bevel gears D and D′ mesh with bevel gears $D^4$ and $D^6$, respectively, which are secured on the same hubs with the die rolls $C^2$ and $C^3$. Fast on the same hubs are the bevel gears $D^5$ and $D^7$, meshing, respectively, with the bevel gears $D^2$ and $D^3$ on the power shaft B′, so that the die rolls C and C′ are secured, respectively, on prolongations of the corresponding power shafts B and B′; while the die rolls $C^2$ and $C^3$ are driven from both sides by the bevel gearing already referred to.

By this balanced construction just referred to, any spring in the apparatus to one side or the other as the bar goes through the mill is obviated or equalized, thus preventing any distortion in the form of the roll forged bar, and permitting the rolling of a series of units of identically the same formation.

A convenient form of arrangement for journaling the die rolls $C^2$ and $C^3$ is shown in Figs. 4 and 5, in which E and E′ are two halves of a yoke, bolted together to form journal bearings for the short shaft F. On this shaft the hub $C^0$ of the die roll is rigidly held, and secured on this hub is a die roll indicated in Fig. 5 as $C^3$, and also secured to this hub, as by means of the bolts G, are the corresponding bevel gears, such as $D^6$ and $D^7$.

The interior of these bevel gear wheels is hollowed, as at $D^0$, to form a water chamber surrounding the hub of the die roll, and suitable connecting passages and grooves are provided for the complete circulation of water, so that water is admitted through the pipe H, see Fig. 5, enters the bore $f$ in the hub $C^0$, enters the water chamber $D^0$, passes through the opening $f'$ in the hub, and escapes through the opening $f^2$ in the hub and through the outlet pipe H′, all as shown in Fig. 5. Complete circulation throughout the water chamber is facilitated by the annular grooves $d$, shown in Figs. 4 and 5.

In order to assemble the various die rolls into the set, and to remove the individual rolls whenever desired, as for purposes of repairs, or where it is desired to change the die rolls for making other sizes of chain, I provide means for removing each yoke with the corresponding die roll and bevel gears. These means also comprise means for varying within narrow limits the relative distances apart of the die rolls. These means comprise two oppositely-disposed wedges, shown in section in Fig. 2 and in enlarged plan in Fig. 3, in which I represents the outer wedge and I′ the inner wedge, each wedge being provided with lugs $i$ and $i'$, respectively, projecting into sockets $i^2$ and $i^3$, respectively, in the opposite wedge, see Fig. 3.

These lugs are internally screw-threaded, but with the screw threads in reverse directions to engage the right and left screw threads $k$ and $k'$ on the adjusting screw K, which has a squared head $k^2$ adapted to be turned by a wrench and by setting up or easing off on the adjusting screw K, each individual die roll may be moved slightly towards or away from the center of the mill.

The bolts L pass through the base flange of the yoke members E and E′, and also through slots $i^0$ in the wedges I and I′, and thus firmly hold the yoke to the housing of the mill, but at the same time allow slight play to the wedges.

In order to adjust the wedges, it is necessary to ease up on the bolts L, set the wedges in the desired position and then lock the bolts tight.

In order to remove the die roll, take out the bolts L, then take out the wedges, and then back out and remove the yoke with its die roll and bevel gears complete.

The foregoing applies more especially to the die rolls $C^2$ and $C^3$, and the accompanying bevel gears; and in order to remove the die rolls C and C′ the additional step will be required of disengaging the flanges $b$ and $b'$ by disengaging the short shafts $B^2$ and $B^3$ from the power shafts B and B′, which may be accomplished by removing the bolts holding the flanges $b$ and $b'$ together, and also removing the keys $b^0$.

The operative parts of a machine of this character have to be constructed with great precision, and it is difficult and expensive to effect the machining in such large parts as constitute the various bearing surfaces in the housing A. In order to avoid such machining I provide recesses $a$, $a'$ and $a^2$ in the housing, each recess having beveled side walls $a^3$ and projecting lugs $a^4$ for holding type metal or similar neutral composition of metal O.

I further provide bearing plates M, machined to bear on one face against the outer wedges I, and on the reverse face having projecting lugs $m$ to hold said plates in the type metal O.

These bearing plates are then set accurately in their proper position in relation to the housing, each in wake of its recess in the housing. Melted type metal O is then poured into the recesses, fixing these plates permanently and accurately in their desired position.

The plates M are provided with guide ribs $m'$ on each side thereof to guide the wedges, and the wedges are also provided with similar guide ribs to guide the corresponding yokes, as shown most clearly in Figs. 1 and 3.

In a similar manner I provide bushings N with their bearings machined on the inside accurately to fit the power shafts B and B′. These bushings are placed accurately in their permanent position in wake of the annular recesses in the bearing bosses at the left side of the housing A, as shown in Fig. 1, and melted type metal O is poured into the recess between the bushing and housing, fixing these bushings permanently and accurately in their desired position.

The form of die rolls and the method of making the same is illustrated and described in my application executed of even date herewith, and entitled Automatic die routing duplicator for die rolls, filed July 26, 1918, Serial No. 246,912.

It will be obvious that in handling the heavy weights herein described, suitable cranes or other lifting devices should be provided; but these are not a part of my present invention and will not be described herein.

While I have shown and described my invention as applied to a machine for the manufacture of weldless chain, it will be obvious that a roll forged bar of any desired form may be rolled by substituting the proper die rolls, and it will also be obvious that various modifications might be made in the herein described construction, and in the combination and arrangement of parts which could be used without departing from the spirit of my invention, and I do not mean to limit my invention to such details except as particularly pointed out in the claims.

Having thus described my invention, what I claim is:

1. In a machine of the character set forth, the combination with a frame provided with a recess, of a plurality of yokes each detachably connected to said frame and projecting into said recess, said yokes each being formed of two halves detachably connected together, die rolls journaled in said yokes, and means for driving said die rolls.

2. In a machine of the character set forth, the combination with a frame having a recess therein, of a plurality of yokes each detachably connected to said frame and projecting into said recess, a wedge interposed between one of said yokes and said frame, means for moving said wedge to adjust said yoke with respect to said frame, and the other of said yokes, dies rolls journaled in said yokes, and means for driving said die rolls.

3. In a machine of the character set forth, the combination with a frame having a recess therein, of a plurality of yokes, each detachably connected to said frame and projecting into said recess, die rolls journaled in said yokes, reversely disposed wedges interposed between each yoke and the frame for adjusting each of said die rolls with respect to the other die rolls, and means for driving said die rolls.

4. In a machine of the character set forth, the combination with a frame provided with a recess, of a plurality of yokes each detachably connected to said frame and projecting inwardly into said recess, a pair of wedges interposed between said yokes and said frame, means for moving the wedges of each pair simultaneously in opposite directions whereby the corresponding yoke may be adjusted towards or away from said frame, die rolls journaled in said yokes, and means for rotating said die rolls.

5. In a machine of the character set forth, the combination with a frame provided with a recess, of a plurality of yokes each detachably connected to said frame and projecting inwardly into said recess, reversely disposed wedges interposed between said yokes and said frame, each wedge being provided with a lug projecting into a recess in the adjacent wedge, said lugs being internally screw-threaded in reverse directions, a right and left handed screw engaging said lugs for moving one wedge over with respect to the other whereby the corresponding yoke may be adjusted towards or away from said frame, die rolls journaled in said yokes, and means for rotating said die-rolls.

6. In a machine of the character set forth, the combination with a frame provided with a recess, of a plurality of yokes each detachably connected to said frame and projecting inwardly into said recess, each yoke being formed of two halves detachably connected to each other and to said frame, and each half yoke being provided with a journal bearing for the corresponding die roll, die rolls journaled in said yokes, and means for rotating said die-rolls.

7. In a machine of the character set forth, the combination with a frame provided with a recess, of a plurality of yokes each detachably connected to said frame and projecting inwardly into said recess, each yoke being formed of two halves detachably connected to each other and to said frame, and each half yoke being provided with a journal bearing for the corresponding die roll, reversely disposed wedges interposed between said yokes and said frame, means for moving one wedge with respect to the other whereby the corresponding yoke may be adjusted towards or away from said frame, die rolls journaled in said yokes, and means for rotating said die rolls.

8. In a machine of the character set forth, the combination with a frame provided with a recess, of a plurality of yokes each detachably connected to said frame and projecting inwardly into said recess, each yoke being formed of two halves detachably connected to each other and to said frame and each half yoke being provided with a journal bearing for the corresponding die roll, reversely disposed wedges interposed between said yokes and said frame, each wedge being provided with a lug projecting into a recess in the adjacent wedge, said lugs being internally screw-threaded in reverse directions, a right and left handed screw engaging said lugs for moving one wedge with respect to the other whereby the corresponding yoke may be adjusted towards or away from the center of said frame, die rolls journaled in said yokes, and means for rotating said die rolls.

9. In a machine of the character set forth, the combination with a frame made of a single unmachined casting and provided with a recess and with a plurality of cavities filled with fusible metal, of bearing plates mounted over the fusible metal contained in said cavities, a plurality of yokes mounted over said bearing plates and projecting inwardly into said recess, die rolls journaled in said yokes, and means for rotating said die rolls.

10. In a machine of the character set forth, the combination with a frame made from a single unmachined casting and provided with a recess and with a plurality of cavities filled with fusible metal, of bearing elements mounted over the fusible metal contained in said cavities, a plurality of yokes mounted over said bearing elements, and projecting into said recess, means interposed between certain of said yokes and bearing elements for adjusting said yokes with respect to said frame, die rolls journaled in said yokes, and means for driving said die rolls.

11. In a machine of the character set forth, the combination with a frame made of a single unmachined casting and provided with a recess and with a plurality of cavities filled with fusible metal, of bearing plates mounted over the fusible metal contained in said cavities, a plurality of yokes mounted over said bearing plates and projecting inwardly into said recess, reversely disposed wedges interposed between said yokes and said bearing plates, means for moving one wedge with respect to the other whereby the corresponding yoke may be adjusted towards or away from said frame, die rolls journaled in said yokes, and means for rotating said die rolls 12. In a machine of the character set forth, the combination with a frame made of a single unmachined casting and provided with a recess and with a plurality of cavities filled with fusible metal, of bearing plates mounted over the fusible metal contained in said cavities, a plurality of yokes mounted over said bearing plates and each detachably connected to said frame and projecting inwardly into said recess, reversely disposed wedges interposed between said yokes and said bearing plates, each wedge being provided with a lug projecting into a recess in the adjacent wedge, said lugs being internally screw-threaded in reverse directions, a right and left handed screw engaging said lugs for moving one wedge with respect to the other whereby the corresponding yoke may be adjusted towards or away from said frame, die rolls journaled in said yokes, and means for rotating said die rolls.

13. In a machine of the character set forth, the combination with a frame made of a single unmachined casting and provided with a recess and with a plurality of cavities filled with fusible metal, of bearing plates mounted over the fusible metal contained in said cavities, a plurality of yokes mounted over said bearing plates and each detachably connected to said frame and projecting inwardly into said recess, each yoke being formed of two halves detachably connected to each other and to said frame, each half yoke being provided with a journal bearing for the corresponding die roll, die rolls journaled in said yokes, and means for rotating said die rolls.

14. In a machine of the character set forth, the combination with a frame made of a single unmachined casting and provided with a recess and with a plurality of cavities filled with fusible metal, of bearing plates mounted over the fusible metal contained in said cavities, a plurality of symmetrically disposed yokes mounted over said bearing plates and each detachably connected to said frame and projecting inwardly into said recess, each yoke being formed of two halves detachably connected to each other and to said frame, each half yoke being provided with a journal bearing for the corresponding die roll, reversely disposed wedges interposed between said yokes and said frame, means for moving one wedge with respect to the other whereby the corresponding yoke may be adjusted towards or away from said frame, die rolls journaled in said yokes, and means for rotating said die rolls.

15. In a machine of the character set forth, the combination with a frame made of a single unmachined casting and provided with a recess and with a plurality of cavities filled with fusible metal, of bearing plates mounted over the fusible metal contained in said cavities, a plurality of yokes mounted over said bearing plates and each detachably connected to said frame and projecting inwardly into said recess, each yoke being formed of two halves detachably connected to each other and to said frame, each half yoke being provided with a journal bearing for the corresponding die roll, reversely disposed wedges interposed between said yokes and said frame, each wedge being provided with a lug projecting into a recess in the adjacent wedge, said lugs being internally screw-threaded in reverse directions, a right and left handed screw engaging said lugs for moving one wedge with respect to the other whereby the corresponding yoke may be adjusted towards or away from the said frame, die rolls journaled in said yokes, and means for rotating said die rolls.

16. In a machine of the character set forth, the combination with a frame provided with a recess, of a plurality of yokes each detachably connected to said frame and projecting inwardly into said recess, reversely disposed wedges interposed between said yokes and said frame, one of said wedges being provided with guide ribs engaging the other wedge and the yoke, means for moving one wedge with respect to the other whereby the corresponding yoke may be adjusted towards or away from said frame, die rolls journaled in said yokes, and means for rotating said die rolls.

17. In a machine of the character set forth, the combination with a frame provided with a recess, of a plurality of yokes each detachably connected to said frame and projecting inwardly into said recess, reversely disposed wedges interposed between said yokes and said frame, one of said wedges being provided with guide ribs engaging the other wedge and the yoke, each wedge being provided with a lug projecting into a recess in the adjacent wedge, said lugs being internally screw-threaded in reverse directions, a right and left handed screw engaging said lugs for moving one wedge with respect to the other whereby the corresponding yoke may be adjusted towards or away from said frame, die rolls journaled in said yokes, and means for rotating said die rolls.

18. In a machine of the character set forth, the combination with a frame provided with a recess, of a plurality of yokes each detachably connected to said frame and projecting inwardly into said recess, each yoke being formed of two halves detachably connected to each other and to said frame, each half yoke being provided with a journal bearing for the corresponding die roll, reversely disposed wedges interposed between said yokes and said frame, one of said wedges being provided with guide ribs engaging the other wedge and the yoke, means for moving one wedge with respect to the other whereby the corresponding yoke may be adjusted towards or away from the center of said frame, die rolls journaled in said yokes, and means for rotating said die rolls.

19. In a machine of the character set forth, the combination with a frame provided with a recess, of a plurality of yokes each detachably connected to said frame and projecting inwardly into said recess, each yoke being formed of two halves detachably connected to each other and to said frame, each half yoke being provided with a journal bearing for the corresponding die roll, reversely disposed wedges interposed between said yokes and said frame, one of said wedges being provided with guide ribs engaging the other wedge and the yoke, each wedge being provided with a lug projecting into a recess in the adjacent wedge, said lugs being internally screw-threaded in reverse directions, a right and left handed screw engaging said lugs for moving one wedge with respect to the other whereby the corresponding yoke may be adjusted towards or away from said frame, die rolls journaled in said yokes, and means for rotating said die rolls.

20. In a machine of the character set forth, the combination with an integral main frame provided with a recess filled with fusible metal, of a bearing body mounted on the face of said fusible metal and having a smooth bearing surface whereby a nicely adjusted bearing surface is provided for the working parts of the machine in an otherwise unmachined frame without the necessity for special machining or other finishing processes, substantially as described.

21. In a machine of the character set forth, the combination with an integral main frame provided with a series of recesses filled with fusible metal, of a bearing body mounted on the face of said fusible metal and having lugs projecting into said fusible metal and holding said bearing body firmly in place, said bearing body being provided with a smooth bearing surface whereby a nicely adjusted bearing surface is provided for the working parts of the machine in an otherwise unmachined frame, without the necessity for special machining or other finishing processes, substantially as described.

22. In a machine of the character set forth, the combination with an integral unmachined main frame provided with a recess filled with fusible metal, of a flat bearing plate mounted on the face of said fusible metal and having a smooth bearing surface whereby a nicely adjusted bearing surface is provided for the working parts of the machine in an otherwise unmachined frame without the necessity for special machining or other finishing processes, substantially as described.

23. In a machine of the character set forth, the combination with an integral unmachined main frame made of cast metal and provided with a recess filled with fusible metal, of a flat bearing plate mounted on the face of said fusible metal, and having lugs projecting into said fusible metal and holding said bearing plate firmly in place, said bearing plate being provided with a smooth bearing surface, whereby a nicely adjusted bearing surface is provided for the working parts of the machine in an otherwise rough casting, without the necessity for special machining or other finishing processes, substantially as described.

In testimony whereof I hereunto affix my signature.

WILLIAM BARNUM COWLES.